United States Patent
Yoshida (10) Patent No.: US 9,671,014 B2
(45) Date of Patent: Jun. 6, 2017

(54) CONTROL APPARATUS AND SHIFT-BY-WIRE SYSTEM HAVING THE SAME

(71) Applicant: DENSO CORPORATION, Kariya, Aichi-pref. (JP)

(72) Inventor: Kazuhiro Yoshida, Tokoname (JP)

(73) Assignee: DENSO CORPORATION, Kariya (JP)

(*) Notice: Subject to any disclaimer, the term of this patent is extended or adjusted under 35 U.S.C. 154(b) by 422 days.

(21) Appl. No.: 14/559,144

(22) Filed: Dec. 3, 2014

(65) Prior Publication Data

US 2015/0160631 A1 Jun. 11, 2015

(30) Foreign Application Priority Data

Dec. 6, 2013 (JP) ................................. 2013-253033
Oct. 24, 2014 (JP) ................................. 2014-217031

(51) Int. Cl.
*G06F 19/00* (2011.01)
*F16H 61/12* (2010.01)
*G06N 99/00* (2010.01)

(52) U.S. Cl.
CPC ..... *F16H 61/12* (2013.01); *F16H 2061/1208* (2013.01); *G06N 99/005* (2013.01)

(58) Field of Classification Search
CPC ..... G05B 19/048; H02P 6/205; H02P 29/032; H02P 29/0241; F16H 61/12; F16H 61/32;
(Continued)

(56) References Cited

U.S. PATENT DOCUMENTS 7,053,581 B2 * 5/2006 Chen .................. B60L 11/1803
                                                         318/432
7,106,017 B2 * 9/2006 Kifuku ................. H02H 7/0833
                                                         318/400.02

(Continued)

FOREIGN PATENT DOCUMENTS

| JP | 10-309095 | 11/1998 |
| JP | 2001-268961 | 9/2001 |
| JP | 2008-064239 | 3/2008 |

OTHER PUBLICATIONS

Bingley, P. "The characteristics and control of rectifier-motor variable-speed drives." Proceedings of the IEE—Part II: Power Engineering 99.69 (1952): 189-202.*

(Continued)

*Primary Examiner* — Michael D Masinick
(74) *Attorney, Agent, or Firm* — Nixon & Vanderhye PC (57) ABSTRACT

A control apparatus controlling a motor for driving an object to switch a shift range of a transmission includes: switching devices for energization to windings of the motor; a controller for the switching devices; a current detecting circuit for a current in the windings and the switching device; a current limit circuit keeping an average of the current within a predetermined range; a standard position learning device of the motor at a learning range such that the current limit circuit limits the current, and the motor rotates until the object stops at a limit position of a movable range; a shift range determination device; and an error determination device determining that the current detecting circuit or the current limit circuit malfunctions when the object does not reach the limit position, the shift range is in a non-learning range, and the standard position learning device starts to learn the standard position.

8 Claims, 5 Drawing Sheets (58) Field of Classification Search
CPC .... F16H 2016/1216; F16H 2061/1208; G06N 99/005
See application file for complete search history.

(56) References Cited

U.S. PATENT DOCUMENTS

| | | | | |
|---|---|---|---|---|
| 7,650,760 | B2* | 1/2010 | Nakata | H02P 6/06 318/722 |
| 8,207,694 | B2* | 6/2012 | Izumi | B60K 6/48 318/400.01 |
| 8,288,979 | B2* | 10/2012 | Bates | H02P 1/04 310/184 |
| 8,381,869 | B2* | 2/2013 | Fujimoto | B62D 5/046 180/443 |
| 8,541,965 | B2* | 9/2013 | Ueda | B62D 5/046 318/400.02 |
| 8,607,648 | B2* | 12/2013 | Ueda | G01D 5/2457 73/862.325 |
| 9,417,617 | B2* | 8/2016 | Yoshida | G05B 19/048 |
| 9,442,468 | B2* | 9/2016 | Yoshida | G05B 13/0265 |
| 2002/0109474 | A1* | 8/2002 | Kifuku | H02H 7/0833 318/434 |
| 2005/0285556 | A1* | 12/2005 | Chen | B60L 11/1803 318/432 |
| 2006/0179859 | A1* | 8/2006 | Nakata | H02P 6/06 62/228.1 |
| 2006/0207373 | A1* | 9/2006 | Amamiya | F16H 61/32 74/473.36 |
| 2008/0047776 | A1* | 2/2008 | Kobayashi | B62D 5/046 180/446 |
| 2010/0052581 | A1* | 3/2010 | Izumi | B60K 6/48 318/400.04 |
| 2010/0066293 | A1* | 3/2010 | Iriguchi | F02N 11/08 318/478 |
| 2010/0253140 | A1* | 10/2010 | Yamashita | B62D 5/0457 307/9.1 |
| 2011/0025238 | A1* | 2/2011 | Ueda | B62D 5/046 318/400.02 |
| 2011/0272205 | A1* | 11/2011 | Fujimoto | B62D 5/046 180/446 |
| 2013/0006486 | A1 | 1/2013 | Shimizu et al. | |
| 2013/0076290 | A1* | 3/2013 | Yoshida | G01D 5/24476 318/652 |
| 2013/0200826 | A1* | 8/2013 | Yoshida | H02P 6/205 318/400.11 |
| 2013/0229136 | A1* | 9/2013 | Bates | H02P 25/18 318/400.41 |

OTHER PUBLICATIONS

Office Action (3 pages) dated Dec. 17, 2015, issued in corresponding Japanese Application No. 2014-217031 (6 pages).
Yoshida et al., U.S. Appl. No. 14/559,284, filed Dec. 3, 2014.
Yoshida et al., U.S. Appl. No. 14/559,175, filed Dec. 3, 2014.
U.S. Appl. No. 14/559,175, filed Dec. 3, 2014, Control Apparatus and Shift-by-Wire System Having the Same.
U.S. Appl. No. 14/559,284, filed Dec. 3, 2014, Control Apparatus and Shift-by-Wire System Having the Same.
U.S. Appl. No. 14/559,144, filed Dec. 3, 2014, Control Apparatus and Shift-by-Wire System Having the Same.

* cited by examiner

CONTROL APPARATUS AND SHIFT-BY-WIRE SYSTEM HAVING THE SAME

CROSS REFERENCE TO RELATED APPLICATIONS

This application is based on Japanese Patent Applications No. 2013-253033 filed on Dec. 6, 2013, and No. 2014-217031 filed on Oct. 24, 2014, the disclosures of which are incorporated herein by reference.

TECHNICAL FIELD

The present disclosure relates to a control apparatus for controlling an operation of a motor and a shift-by-wire system having the same.

BACKGROUND

Conventionally, in a vehicular control technique, a by-wire system for electrically controlling an actuator of changing a vehicle state with a by-wire control circuit according to an instruction from a driver of a vehicle is well known. For example, Patent document No. 1 teaches a shift-by-wire system for switching a shift lever according to an instruction of the driver. In the system, the operation of the actuator having a brushless motor is controlled so that the shift range is changed by rotatably driving a detent plate in a shift range switching device.

In the shift-by-wire system according to Patent document No. 1, based on a counting value of a pulse signal output from an encoder at every predetermined angle in synchronization with a rotation of the motor, the shift range is switched to a target range by rotating the motor to reach a target rotation position, which corresponds to the target range. Further, in the shift-by-wire system according to Patent document No. 1, before starting a switching control of the shift range, i.e., before starting a normal driving control of the motor, the system rotates the motor until the detent plate stops at a limitation position in a movable range so that a standard position learning control for learning a standard position of the motor is performed. When the system learns the standard position, the limitation position coincides with the standard position of the motor. Thus, after that, the system can perform the normal driving control for rotating the motor toward the target rotation position.

Here, when the standard position learning control is executed in a system for controlling a current flowing through each phase of a winding of the motor according to a duty ratio corresponding to a voltage, even if the voltage is same, the current flowing through each phase of a winding of the motor may change according to a change of a winding resistance caused by temperature change and/or chronological change, so that the torque of the motor is changed. Thus, the accuracy of the standard position learning control may be reduced. This view point is not considered in the system according to Patent document No. 1. Thus, in the system according to Patent document No. 1, the accuracy of the standard position learning control may be reduced according to the condition change such as the temperature change or the chronological change.

When the standard position learning control is performed, the current flowing through the windings is limited so as to reach the sum of current flowing through each phase of the winding of the motor to be a predetermined current limitation value. Thus, the change of the current in each phase caused by the temperature change or the chronological change is restricted, so that the accuracy of the standard position learning control is improved even if the condition is changed. However, when the system includes a physical circuit for detecting the sum of the current flowing through each phase of the winding of the motor, and/or when the system includes a physical circuit for restricting the current flowing through the windings, if the circuit is damaged, the standard position may not be learned properly.

(Patent document No. 1) JP-2004-308752-A corresponding to US 2006/0207373 A1

SUMMARY

It is an object of the present disclosure to provide a control apparatus detecting an operation error of the circuit relating to the standard position learning and having high accuracy of the standard position learning control. It is another object of the present disclosure to provide a shift-by-wire system having a control apparatus.

According to a first aspect of the present disclosure, a control apparatus that controls a motor, which has a plurality of windings respectively corresponding to a plurality of phases, and rotates and drives an object to switch a shift range of a transmission, includes: a plurality of switching devices, each of which corresponds to one of the plurality of phases, allows energization to a corresponding winding when the switching device turns on, and interrupts the energization to the corresponding winding when the switching device turns off; a controller that controls the switching devices to turn on and off so that the controller controls an operation of the motor; a current detecting circuit that detects a current flowing through each winding and each switching device; a current limit circuit that limits the current flowing through each winding and each switching device to keep an average of the current within a predetermined range; a standard position learning device that learns a standard position of the motor in such a manner that the current limit circuit limits the current flowing through each winding and each switching device, and the controller controls the motor to rotate until the object stops at a limit position of a movable range; a shift range determination device that determines the shift range of the transmission; and an error determination device that determines whether at least one of the current detecting circuit and the current limit circuit malfunctions. The standard position learning device learns the standard position of the motor at a shift range, which is defined as a learning range. A shift range other than the learning range is defined as a non-learning range. The error determination device determines that at least one of the current detecting circuit and the current limit circuit malfunctions under a condition that the object does not reach the limit position of the movable range when the shift range determination device determines that the shift range of the transmission is in the non-learning range, and the standard position learning device starts to learn the standard position.

In the above apparatus, when the standard position of the motor is learned, the current flowing through the windings and the switching devices is restricted by the current limit circuit based on the current detected by the current detecting circuit, and the motor is rotated and driven. Thus, a change of the current in each phase caused by temperature change and/or chronological change is restricted, and the change of a torque of the motor is restricted. Accordingly, the learning accuracy of the standard position is improved notwithstanding a change of a condition such as the temperature change and the chronological change.

Further, the error determination device detects the error such that the torque for moving the object to the limit position is not generated since at least one of the current detecting circuit and the current limit circuit malfunctions. Thus, the standard position is not learned under a condition that the current detecting circuit or the current limit circuit malfunctions. Accordingly, the apparatus avoids the malfunction and/or loss of control of the motor caused by an erroneously learned standard position.

According to a second aspect of the present disclosure, a shift-by-wire system includes: a control apparatus; a motor controlled by the control apparatus; and an object rotated and driven by the motor. The motor has a plurality of windings respectively corresponding to a plurality of phases, and rotates and drives an object to switch a shift range of a transmission. The control apparatus includes: a plurality of switching devices, each of which corresponds to one of the plurality of phases, allows energization to a corresponding winding when the switching device turns on, and interrupts the energization to the corresponding winding when the switching device turns off; a controller that controls the switching devices to turn on and off so that the controller controls an operation of the motor; a current detecting circuit that detects a current flowing through each winding and each switching device; a current limit circuit that limits the current flowing through each winding and each switching device to keep an average of the current within a predetermined range; a standard position learning device that learns a standard position of the motor in such a manner that the current limit circuit limits the current flowing through each winding and each switching device, and the controller controls the motor to rotate until the object stops at a limit position of a movable range; a shift range determination device that determines the shift range of the transmission; and an error determination device that determines whether at least one of the current detecting circuit and the current limit circuit malfunctions. The standard position learning device learns the standard position of the motor at a shift range, which is defined as a learning range. A shift range other than the learning range is defined as a non-learning range. The error determination device determines that at least one of the current detecting circuit and the current limit circuit malfunctions under a condition that the object does not reach the limit position of the movable range when the shift range determination device determines that the shift range of the transmission is in the non-learning range, and the standard position learning device starts to learn the standard position.

In the above system, a change of the current in each phase caused by temperature change and/or chronological change is restricted, and the change of a torque of the motor is restricted. Accordingly, the learning accuracy of the standard position is improved notwithstanding a change of a condition such as the temperature change and the chronological change. Further, the error determination device detects the error such that the torque for moving the object to the limit position is not generated since at least one of the current detecting circuit and the current limit circuit malfunctions. Thus, the standard position is not learned under a condition that the current detecting circuit or the current limit circuit malfunctions. Accordingly, the apparatus avoids the malfunction and/or loss of control of the motor caused by an erroneously learned standard position.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be explained with reference to drawings.

Embodiments

Figure 1:
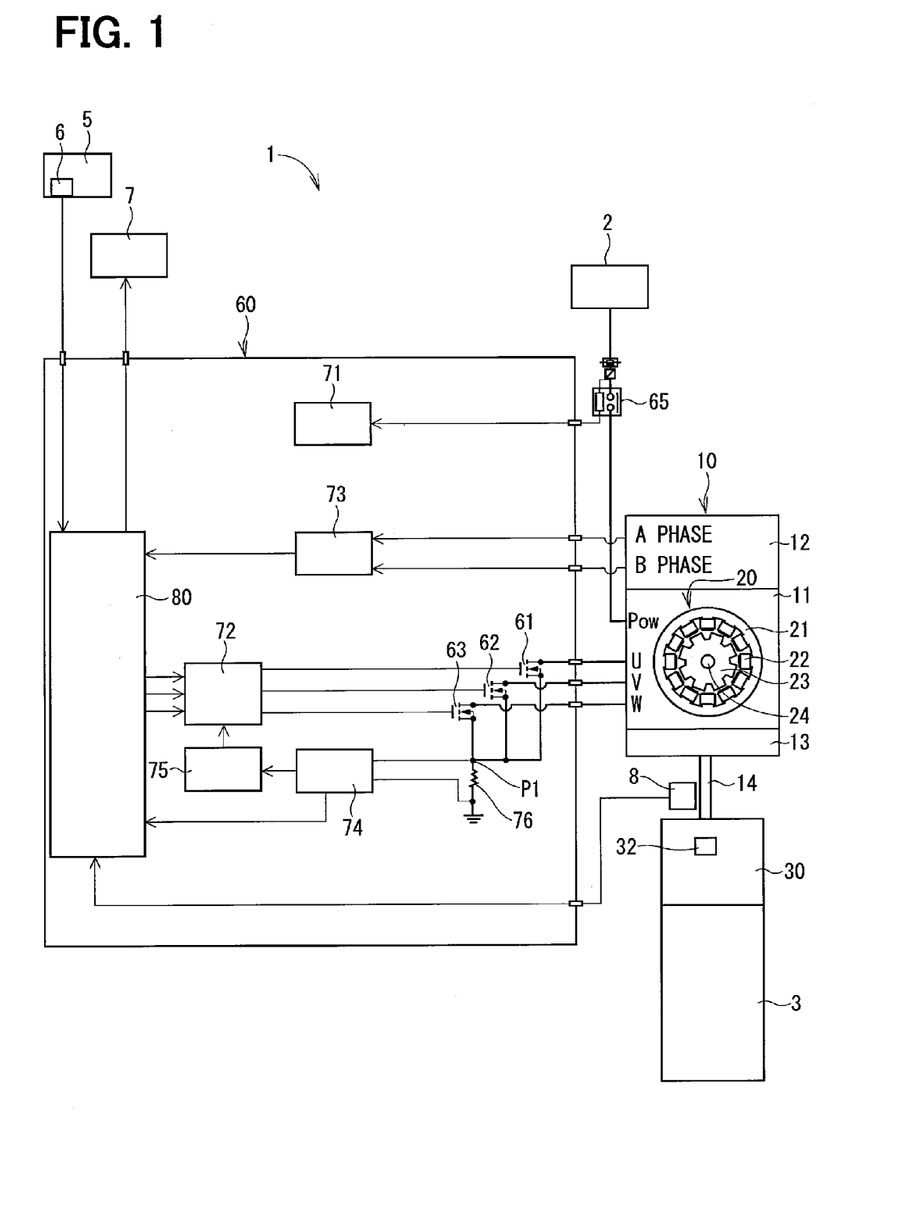
FIG. 1 is a diagram showing a shift-by-wire system having an electric control unit according to an example embodiment of the present disclosure.

An electronic control unit (i.e., ECU) 60 as a control apparatus according to the present example embodiment and a shift-by-wire system 1 having the ECU are shown in FIG. 1. The shift-by-wire system 1 includes an actuator 10, a shift range switching device 30, the ECU 60, and the like. The system 1 is mounted on a vehicle together with an automatic transmission 3, for example. The system 1 drives the actuator 10 and the shift range switching device 30 according to an instruction of a driver of the vehicle, so that the shift range of the automatic transmission 3 is switched by the by-wire control.

The actuator 10 includes a housing 11, a motor 20, an encoder 12, a reducer 13, and an output shaft 14.

In the present example embodiment, the motor 20 is, for example, a switched reluctance motor (i.e., SR motor), which is a three-phase driving type brushless motor for generating a driving force without using a permanent magnet. The motor 20 includes a stator 21, a winding 22, a rotor 23 and a motor shaft 24.

The stator 21 is fixed in the housing 11. Multiple windings 22 are arranged to wind around a protrusion pole of the stator 21. Each winding 22 corresponds to one of three phases of the motor (i.e., one of a U phase, a V phase and a W phase). The rotor 23 is rotatably arranged in the stator 21. The rotor 23 includes multiple protrusions, which protrude toward a radially outside direction and are arranged along a circumference at equal intervals. The motor shaft 24 is integrated with the rotor 23, and the shaft 24 is rotatably supported by the housing 11.

When the energization to the winding 22 of each phase in the motor 20 is switched sequentially, the rotation magnetic field is generated at the stator 21, so that the rotor 23 rotates.

Thus, the motor 20 rotates when the electric power is supplied from a battery 2 as a power source of the vehicle. The ECU 60 controls the driving operation of the motor 20 by switching the energization to the winding 22 of each phase supplied from the battery 2.

The encoder 12 includes a magnet integrally rotatable with the rotor 23, and a magnetic field detection Hall IC mounted on a substrate, which is fixed to the housing 11. The Hall IC is opposed to the magnet, and detects that a magnetic flux generating unit passes through the Hall IC. In the present embodiment, the encoder 12 is an incremental type element so that the encoder 12 outputs a pulse signal in a A phase and a pulse signal in a B phase according to a change of a rotation angle of the motor 20 (i.e., the rotor 23).

The reducer 13 reduces the rotation motion, i.e., rotation speed of the motor shaft 24 in the motor 20, and then, outputs the reduced rotation motion via the output shaft 14. Thus, the reducer 13 transmits the rotation motion to the shift range switching device 30. The shift range switching device 30 transmits the rotation driving force, which is transmitted from the reducer 13, to a manual valve 4 and a parking lock mechanism 50, as shown in FIG. 2.

Figure 2:
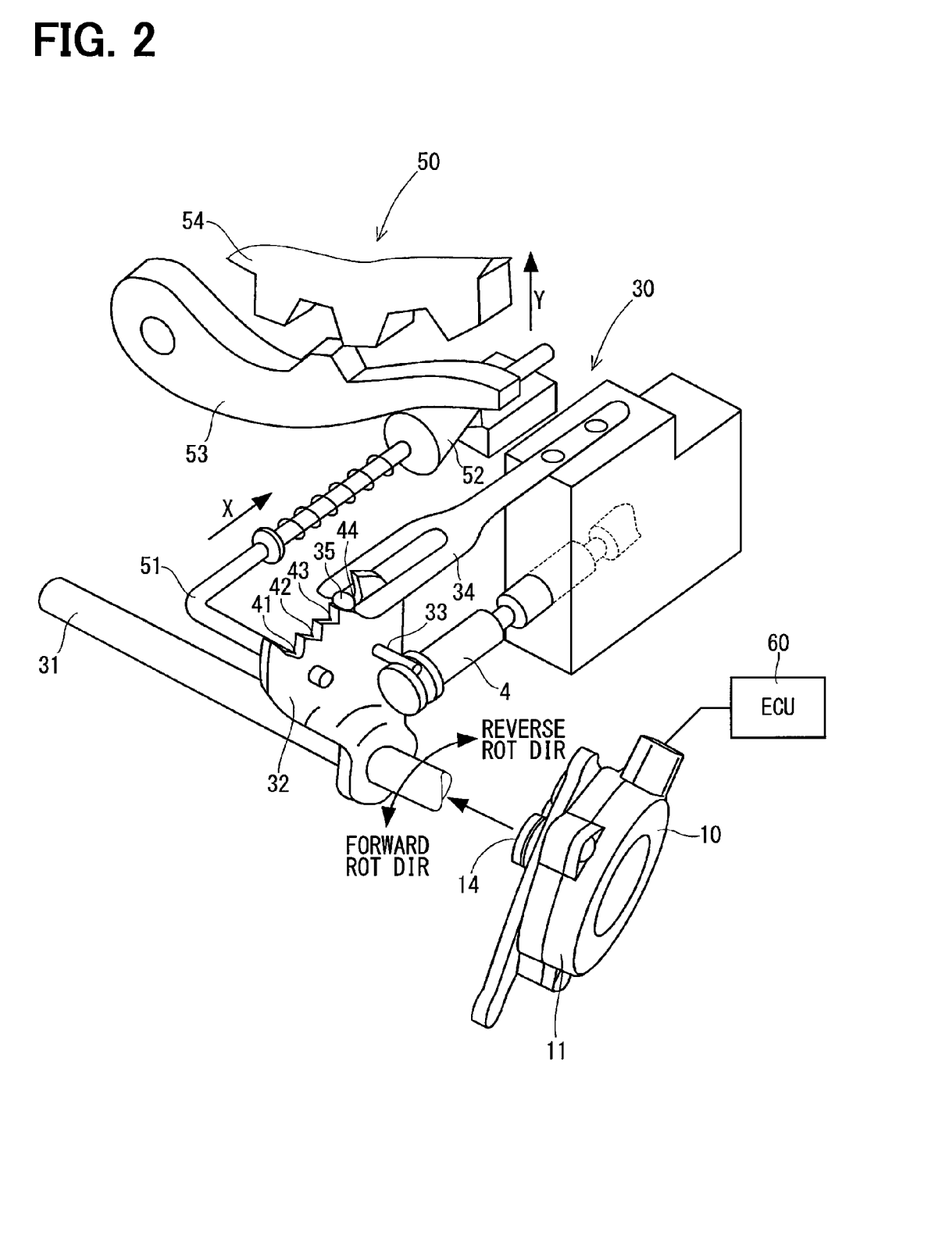
FIG. 2 is a diagram showing a perspective view of a shift range switching device in FIG. 1.

As shown in FIG. 2, the shift range switching device 30 includes a manual shaft 31, a detent plate 32 and a detent spring 34.

The manual shaft 31 is connected to the output shaft 14 of the actuator 10. The shaft 31 is driven and rotated by a rotation driving force of the motor 20. The detent plate 32 protrudes from the manual shaft 31 toward the radially outside direction. The detent plate 32 is fixed to the manual shaft 31. The detent plate 32 corresponds to a driven object.

A pin 33 is formed on the detent plate 32, and the pin 33 protrudes toward a direction in parallel to the manual shaft 31. The pin 33 is engageable with an end of the manual valve 4 along the axial direction of the manual valve 4. Accordingly, when the detent plate 32 rotates together with the manual shaft 31, the manual valve 4 moves along the axial direction. Specifically, the shift range switching device 30 converts the rotation motion of the actuator 10 to be a linear motion, and then, transmits the linear motion to the manual valve 4.

The detent plate 32 includes concavities 41-44 on an outer periphery thereof. The concavity 41 is formed on the detent plate 32 on one end in the rotation direction. The concavity 44 is formed on the detent plate 32 on the other end in the rotation direction. The concavities 42, 43 are formed between the concavities 41, 44. In the present embodiment, the concavity 41 corresponds to a P range (i.e., parking range) of the shift range in the automatic transmission 3. The concavity 42 corresponds to a R range (i.e., reverse range). The concavity 43 corresponds to a N range (i.e., neutral range) of the shift range in the automatic transmission 3. The concavity 44 corresponds to a D range (i.e., drive range).

The detent spring 34 has a plate shape, which is elastically deformable. The detent spring 34 has a detent roller 35 on a top end of the spring 34 as a limiter. The detent spring 34 pushes the detent roller 35 toward a rotation center of the detent plate 32 (corresponds to the center of the manual shaft 31). When a rotation force equal to or larger than a predetermined value is applied to the detent plate 32, the detent spring 34 is elastically deformed so as to bend, and the detent roller 35 hops over one of convexities formed among the concavities 41-44 and moves to a next concavity 41-44, which is adjacent to a current concavity 41-44. Accordingly, when the actuator 10 rotates the manual shaft 31, the position of the manual valve 4 in the axial direction and the state of the parking lock mechanism 50 are changed, so that the shift range of the automatic transmission 3 is changed.

When the detent roller 35 is engaged with one of the concavities 41-44, the rotation of the detent plate 32 is limited. Thus, the position of the manual valve 4 in the axial direction and the state of the parking lock mechanism 50 are defined. Further, the shift range of the automatic transmission 3 is fixed. Thus, the detent plate 32 and the detent roller 35 function as a detent mechanism.

In the present embodiment, when the shift range is switched from the P range to the R range, the N range or the D range, the rotating direction of the output shaft 14 in the actuator 10 is defined as the forward rotation direction. On the other hand, when the shift range is switched from the D range to the N range, the R range, or the P range, the rotating direction of the output shaft 14 in the actuator 10 is defined as the reverse rotation direction.

FIG. 2 shows a state of the parking lock mechanism 50 when the shift range is the D range, i.e., when the shift range is not the P range. In this acse, the parking gear 54 is not locked by the parking lock pole 53. Accordingly, the rotation of the automatic transmission 3 is not prevented. When the output shaft 14 of the actuator 10 rotates in the reverse rotation direction from this state, the rod 51 is pushed toward a X direction in FIG. 2 via the detent plate 32. Further, the taper portion 52 arranged on the top end of the rod 51 is pushed up in a Y direction in FIG. 2. Thus, the parking lock pole 53 is engaged with the parking gear 54, so that the parking gear 54 is locked. As a result, the rotation of the automatic transmission 3 is limited. In this case, the detent roller 35 of the detent spring 34 is engaged with the concavity 41 of the detent plate 32 (i.e., the detent roller 35 is disposed at the center of the concavity 41). The actual range of the automatic transmission 3 (which is defined as an actual range) is the P range.

Next, the detail of the ECU 60 will be explained as follows.

As shown in FIG. 1, the ECU 60 is a small computer having a MPU 80 as a calculation device, a RAM and a ROM as a memory device, various circuits and input/output device. The ECU 60 controls various devices and elements according to various programs stored in the Rom based on data stored in the RAM and the ROM and signals input from various sensors mounted on the vehicle. The ECU 60 is electrically coupled with the battery 2 as a power source of the vehicle. The ECU 60 is energized by the electricity supplied from the battery 2.

Specifically, the ECU 60 includes a relay 65, MOS transistors 61-63, a relay drive circuit 71, a MOS drive circuit 72, an encoder detecting circuit 73, a current detecting circuit 74, a current limit circuit 75 and a MPU 80.

The relay 65 is arranged between the battery 2 and the motor 20. The relay 65 allows supplying the electricity from the battery 2 to the motor 20 when the relay 65 turns on. When the relay 65 turns off, the electric power supply from the battery 2 to the motor 20 is interrupted.

The relay driving circuit 71 is coupled with the relay 65. The relay driving circuit 71 outputs an on-state signal to the relay 65 so that the circuit 71 controls the relay 65 to turn on. The circuit 71 stops outputting the on-state signal so that the circuit 71 controls the relay 65 to turn off.

The MOS transistors 61-63 are switching elements such as a MOS-FET. Three MOS transistors 61-63 are arranged so as to correspond to three phases of the windings 22 in the motor 20. The drain terminal of the MOS transistor 61 is connected to the winding 22 in the U phase, the drain terminal of the MOS transistor 62 is connected to the winding 22 in the V phase, and the drain terminal of the MOS transistor 63 is connected to the winding 22 in the W phase. The source terminal of each MOS transistor 61-63 is connected to each other at a merging point P1. The merging point P1 is connected to a ground, i.e., a low potential side of the battery 2, via the resistor 76.

The MOS driving circuit 72 is connected to the gate terminal of each MOS transistor 61-63. The MOS driving circuit 72 outputs the on-state signal (i.e., a driving signal) to the gate terminal of each MOS transistor 61-63, so that the circuit 72 turns on the MOS transistor 61-63. Further, the circuit 72 stops outputting the on-state signal, so that the circuit 72 turns off the transistor 61-63.

The encoder detecting circuit 73 is connected to the encoder 12. The encoder detecting circuit 73 detects the pulse signal in the A phase and the pulse signal in the B phase, which output from the encoder 12 according to the change amount of the rotation angle of the motor 20 (i.e., the rotor 23). The pulse signal is output to the MPU 80. The current detecting circuit 74 is connected to the merging point P1, at which the current flowing through the windings 22 and the MOS transistors 61-63 merges. Thus, the circuit 74 detects the current flowing through the merging point P1. A signal indicative of the current flowing through the merging point P1 is output to the current limit circuit 75 and the MPU 80.

The current limit circuit 75 is connected to the current detecting circuit 74 and the MOS driving circuit 72. The current limit circuit 75 controls the MOS driving circuit 72 to keep the average of the current detected by the current detecting circuit 74 within a predetermined range. Thus, the circuit 75 limits the current flowing through the windings 22 and the MOS transistors 61-63.

The MPU 80 is a semiconductor chip for executing various calculations. The MPU 80 includes a relay control element, a MOS control element, a rotation detecting element, an initial driving element, a target range setting element, a normal driving element, a standard position learning element, an actual range detecting element, a rotation angle change amount detecting element, and an error determining element, which are functional devices.

The relay control element controls the relay driving circuit 71 so that the relay control element controls the relay 65 to turn on and off.

The MOS control element calculates the driving signal with respect to the MOS transistors 61-63. The MOS control element controls the MOS driving circuit 72 to output the calculated signal from the MOS driving circuit 72, so that the MOS control element controls the MOS transistors 61-63 to turn on and off. When the relay 65 is in the on-state, and the MOS transistor 61 is controlled to turn on, the current flows through the winding in the U phase. When the MOS transistor 62 is controlled to be in the on-state, the current flows through the winding 22 in the V phase. When the MOS transistor 63 is controlled to be in the on-state, the current flows through the winding 22 in the W phase.

The MPU 80 and the MOS driving circuit 72 control the MOS transistors 61-63 to turn on and off, so that the MPU 80 and the circuit 72 control the driving operation of the motor 20. The MPU 80 and the MOS driving circuit 72 correspond to a control apparatus.

The rotation detecting element reduces (i.e., counts down) or increases (i.e., counts up) a counting value (i.e., a counting value of the pulse signal) according to the pulse signal output from the encoder 12. Thus, the rotation detecting element detects the rotation state of the motor 20 (i.e., the rotor 23). Thus, the motor 20 is driven at high rotating speed without deviating from a proper operation.

The initial driving element executes an initial driving control operation for learning a magnetizing and energizing phase of the motor 20 at every time when the power source of the vehicle turns on. Specifically, the initial driving element executes the initial driving control operation for synchronizing the counting value according to the pulse signal output from the encoder 12 with the energizing phase at every time of the activation of the shift-by-wire system 1. In the initial driving control operation, the rotation of the actuator 10 is appropriately controlled.

The selector sensor 6 detects the shift range, which is instructed by the driver of the vehicle using the selector 5, and defined as an instructed shift range. A signal indicative of the instructed shift range is output to the MPU 80.

The target range setting element sets the target range based on the signal indicative of the instructed shift range output from the selector sensor 6. In the embodiment, the target range is set according to the signal of the selector sensor 6, the signal of the brake, and the signal of the vehicle speed sensor and the like.

The normal driving element detects the rotation position of the rotor 23 with respect to the stator 21 according to the pulse signal counting value. The normal driving element outputs an instruction to the MOS controlling element so that the energizing phase of the winding 22 in the motor 20 is switched sequentially. Thus, the normal driving element rotates and drives the rotor 23 toward the target rotation position, and the shift range of the automatic transmission 3 is switched to the target range. The normal driving element executes this normal driving control operation so that the actual range of the automatic transmission 3 is switched to the instructed shift range, which is required by the driver.

Here, since the encoder 12 in the present embodiment is an incremental type encoder, the encoder 12 detects only a relative rotation position of the motor 20 (i.e., the rotor 23). Accordingly, when the motor 20 is rotated and the shift range is switched to the required shift range, it is necessary to learn a standard position corresponding to the absolute position of the motor 20 and to match the limit position of the movable range (i.e., the rotatable range) of the detent plate 32 to the standard position. After learning the standard position of the motor 20, the rotation position of the motor 20 corresponding to the required shift range is calculated according to the standard position and the predetermined rotation amount (i.e., a control constant). The motor 20 is rotated so as to be at the calculated rotation position, so that the actual range is switched to the required shift range.

The standard position learning element executes the standard position learning control operation for learning the standard position of the motor 20 by rotating the motor until the detent plate 32 stops at the limit position of the movable range. In the present embodiment, the limit position of the movable range is disposed at the position corresponding to the P range or the D range. Further, the standard position learning element outputs an instruction to the MOS controlling element in order to rotate the motor 20 (i.e., rotor 23) with a two-phase energizing method such that two phases among three phases of the windings 22 are energized, and the energizing phases are switched in turn. Further, the standard position learning element learns the standard position based on the counting value of the pulse signal from the encoder 12 after a predetermined stand-by time has elapsed since the motor 20 stops rotating. When the standard position learning control operation is executed, the motor 20 is rotated until the detent roller 35 hits on the wall of the concavity 41 corresponding to the P range or on the wall of the concavity 44 corresponding to the D range. Thus, the standard position learning control operation is defined as a hitting-wall learning control operation or a contact learning control operation. A shift range corresponding to the limit position, i.e., a shift range at which the standard position learning operation is performed, is defined as a learning range. A shift range other than the learning range such as the N range and the R range in the present embodiment is defined as a non-learning range.

The actual range detecting element detects indirectly the actual range by calculating the accrual range based on the standard position, the predetermined rotation amount, and the counting value of the pulse signal from the encoder 12, which is equal to the rotation position of the motor 20, after executing the standard position learning control operation. In the present embodiment, the actual range detecting element detects the actual range based on the rotation position of the motor 20 when the center of the detent roller 35 is positioned in a range of one of the concavities 41-44, which correspond to the P range, the R range, the N range and the D range of the detent plate 32.

Here, when the standard position learning control operation is performed, and the current flowing through each phase of the winding 22 of the motor 20 is controlled with a duty ratio corresponding to the voltage, the learning accuracy of the standard position may be reduced since the torque of the motor 20 is changed according to a change of the current flowing through each phase of the winding 22 in the motor 20 caused by the change of the winding resistance such as temperature change or chronological change even if the voltage is same.

Thus, the standard position learning element limits the current flowing through the windings 22 and the MOS transistors 61-63 using the current limit circuit 75 so that the current flowing through the merging point P1 is disposed within the predetermined range when the motor 20 is rotated. Thus, the change of the current flowing through each phase caused by the temperature change and/or the chronological change is restricted, and therefore, the learning accuracy of the standard position is improved notwithstanding the condition. In the present embodiment, the torque generated in a case where the current at the lower limit of the predetermined range flows through the windings 22 is set to reach the shift range of the automatic transmission 3 from the non-learning range to the learning range.

The output shaft sensor 8 is a rotation position sensor for outputting a signal corresponding to a rotation position of the output shaft 14 of the reducer 13 in the actuator 10. The MPU 80 confirms based on the signal output from the output shaft sensor 8 whether the actual range is the P range, the R range, the N range, and the D range.

The shift range determination device determines the actual range based on the signal output from the output shaft sensor 8 just after the shift-by-wire system 1 is activated.

The error determining device determines that at least one of the current detecting circuit 74 and the current limit circuit 75 malfunctions when the standard position learning device starts to learn the standard position under a condition that the shift range determination device determines that the actual range is in the learning range, and the detent plate 32 does not reach the limit position of the movable range. In the present embodiment, the error determining device determines that the at least one of the current detecting circuit 74 and the current limit circuit 75 malfunctions when the signal output from the output shaft sensor 8 is not changed to the signal corresponding to the learning range after the standard position learning device starts to learn the standard position until a predetermined time has elapsed. The predetermined time is set to a sum of a predetermined allowance time and the time interval, for which the shift range of the automatic transmission 3 reaches from the non-learning range to the learning range, when the current limit circuit 75 limits the average of the current flowing through the merging point P1 within the predetermined range, and the average of the current is the lower limit of the predetermined range. When the error determining device determines the error, for example, a warning light of the display device 7 turns on. Thus, the malfunction of the shift-by-wire system 1 is notified to the driver, and the normal driving control operation using the normal driving element is restricted or prohibited.

The error determining device functions as a normal operation determining device for determining that the current detecting circuit 74 and the current limit circuit 75 function normally when the detent plate 32 reaches the limit position of the movable range within a predetermined time interval.

Next, the control operation of the motor 20 using the MPU 80 will be explained with reference to FIG. 3.

Figure 3:
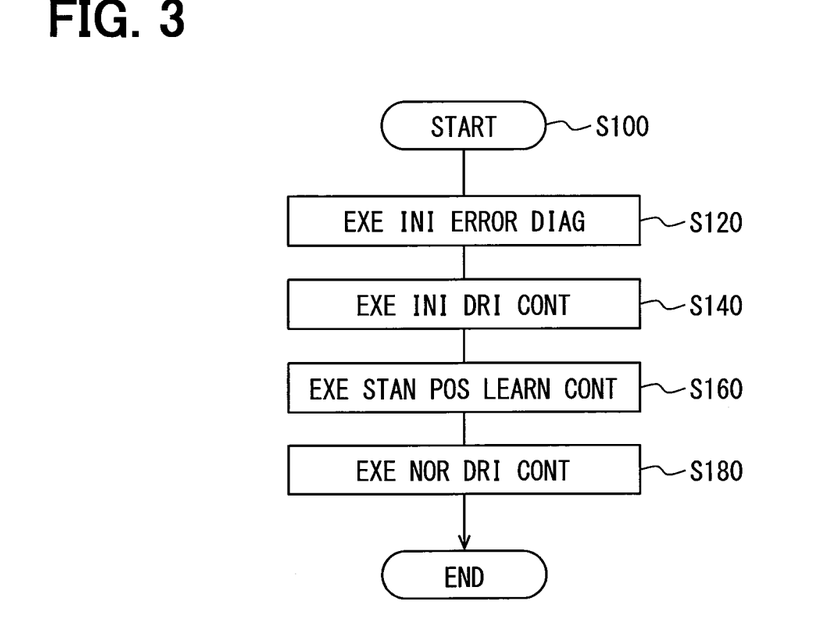
FIG. 3 is a flowchart showing a process relating to a motor control using a MPU of an electronic control unit.

The process S100 shown in FIG. 3 starts when the ignition switch turns on, i.e., the power source of the vehicle turns on so that the shift-by-wire system 1 is activated.

At step S120, the MPU 80 executes the initial error diagnosis. Specifically, the MPU 80 diagnoses whether an error occurs at each part of the shift-by-wire system 1 such as the relay 65. When the error is detected, the error of the shifty-by-wire system 1 is notified to the driver such that the warning light of the display device 7 turns on. After step S120 is completed, it goes to step S140.

At step S140, the MPU 80 executes the initial driving control operation. Thus, the rotation of the actuator 10 (i.e., the motor 20) is appropriately controlled. After step S140, it goes to step S160.

At step S160, the MPU 80 executes the standard position learning control operation. Thus, the limit position of the movable range of the detent plate 32 coincides with the standard position, and therefore, the motor can be operated in the normal driving control operation. The MPU 80 restricts the current flowing through the windings 22 and the MOS transistors 61-63 using the current limit circuit 75, and rotates the motor 20 when the MPU executes the standard position learning control operation at step S160. After step S160, it goes to step S180.

At step S180, the MPU 80 starts to execute the normal driving control operation. Thus, the shift range of the automatic transmission 3 is switched to a required shift range of the driver.

When the ignition switch turns off, the process ends.

Next, a process for detecting the error in the current detecting circuit 74 and the current limit circuit 75 executed by the MPU 80 will be explained with reference to FIG. 4.

Figure 4:
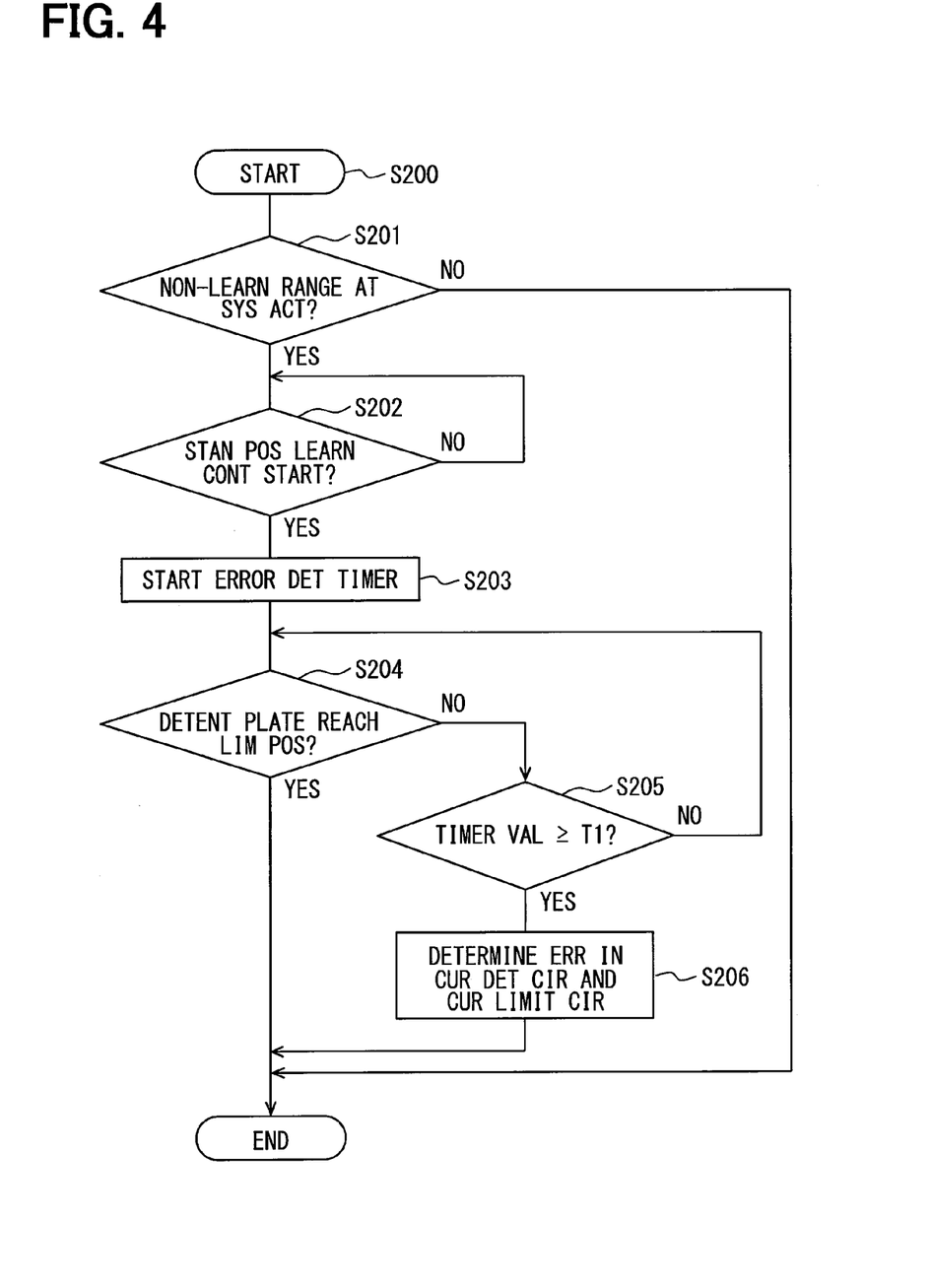
FIG. 4 is a flowchart showing a process for detecting error in a current detecting circuit and a current limit circuit using the MPU of the electronic control unit in FIG. 1.

The MPU 80 starts to execute a process S200 shown in FIG. 4 when the ignition switch turns on, i.e., when the vehicle power source turns on, and the shift-by-wire system 1 is activated.

At step S201, the MPU 80 determines based on the signal output from the output shaft sensor 8 whether actual range is in the non-learning range. When the determination at step S201 is positive, i.e., when the determination at step S201 is "YES," it goes to step S202. When the determination at step S201 is negative, i.e., when the determination at step S201 is "NO," the MPU 80 ends the process S200.

At step S202, the MPU 80 determines whether the standard position learning control operation starts. In the present embodiment, when the shift-by-wire system 1 is activated, and the actual range is in the non-learning range such as the N range or the R range, the MPU 80 executes the standard position learning control operation under a condition that the instruction range coincides with the learning range such as the P range or the D range after the system 1 is activated. When the determination at step S202 is positive, i.e., when the determination at step S202 is "YES," it goes to step S203. When the determination at step S202 is negative, i.e., when the determination at step S202 is "NO," the MPU 80 repeats step S202.

At step S203, the MPU 80 starts to execute time measurement using an error determining timer as a timer for measuring time until the MPU 80 determines the error. After step S203, it goes to step S204.

At step S204, the MPU 80 determines whether the detent plate 32 reaches the limit position of the movable range. In the present embodiment, when the signal output from the output shaft sensor 8 is changed to the signal corresponding to the learning range, the MPU 80 determines that the detent plate 32 reaches the limit position of the movable range. When the signal output from the output shaft sensor 8 is not changed to the signal corresponding to the learning range, the MPU 80 determines that the detent plate 32 does not reach the limit position of the movable range. When the determination at step S204 is positive, i.e., when the determination at step S204 is "YES," the MPU 80 complete the process in FIG. 4. When the determination at step S204 is negative, i.e., when the determination at step S204 is "NO," it goes to step S205.

At step S205, the MPU 80 determines whether the timer value of the error determining timer is equal to or longer than a predetermined time interval T1. When the determination at step S205 is positive, i.e., when the determination at step S205 is "YES," it goes to step S206. When the determination at step S205 is negative, i.e., when the determination at step S205 is "NO," it returns to step S204.

At step S206, the MPU 80 determines that at least one of the current detecting circuit 74 and the current limit circuit 75 malfunctions. For example, a warning light of the display device 7 turns on. Thus, the malfunction of the shift-by-wire system 1 is notified to the driver, and the normal driving control operation using the normal driving element is restricted or prohibited. After step S206, the MPU 80 ends the process S200.

Next, a process for detecting the error in the current detecting circuit 74 and the current limit circuit 75 executed by the MPU 80 will be explained with reference to FIG. 5.

Figure 5:
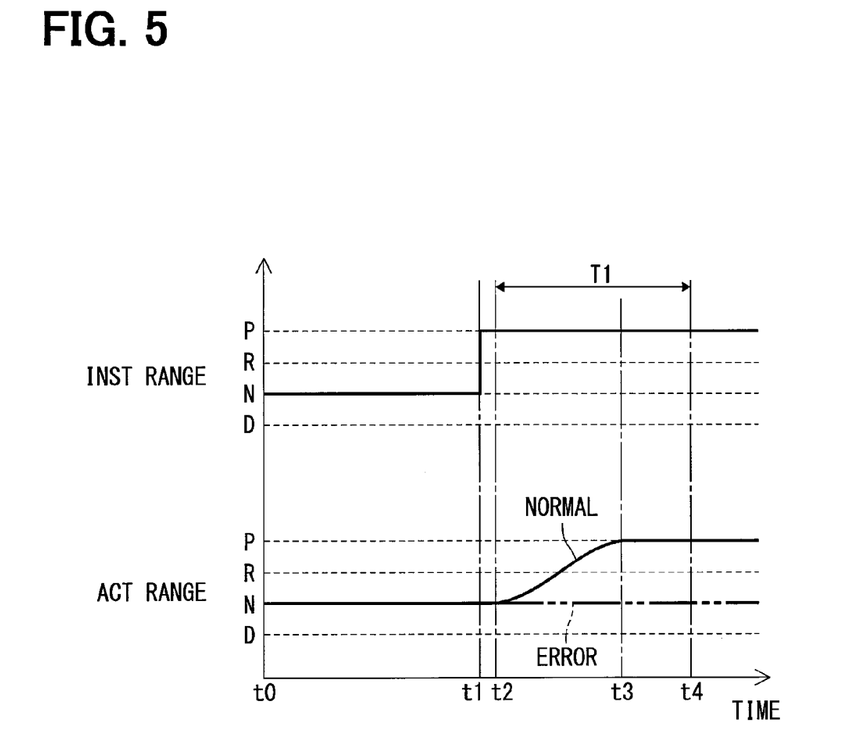
FIG. 5 is a diagram showing a timing chart of the process for detecting error in the current detecting circuit and the current limit circuit using the MPU of the electronic control unit in FIG. 1.

Time t0 in FIG. 5 represents the activation time of the shift-by-wire system 1. At time t0, the instruction range and the actual range are commonly in the N range. At time t0, the MPU 80 starts to execute the process S200 in FIG. 4. Just after the MPU 80 starts to execute the process, the MPU 80 determines at step S201 in FIG. 4 that the determination is positive.

At time t1 in FIG. 5, the instruction range is changed to the P range. At time t2 just after time t1, the MPU 80 starts to execute the standard position learning control operation. When the MPU 80 starts to execute the standard position learning control operation, the MPU 80 determines at step S202 in FIG. 4 that the determination is positive.

In case of normal operation, the actual range is switched to the P range at time t3 shown as a solid line in FIG. 5 before the predetermined time interval T1 has elapsed from time t2. When the actual range is switched to the P range, the MPU 80 determines at step S204 in FIG. 4 that the determination is positive.

On the other hand, when one of or both of the current detecting circuit 74 and the current limit circuit 75 malfunction, and the torque for rotating the detent plate 32 is not generated, the actual range is not switched to the P range shown as a two-dot chain line even if the predetermined time interval T1 has elapsed from time t2. Thus, at time t4 when the predetermined time interval T1 has elapsed, the MPU 80 determines at step S205 in FIG. 4 that the determination is positive. The MPU 80 determines that at least one of the current detecting circuit 74 and the current limit circuit 75 malfunctions.

As described above, in the present embodiment, the ECU 60 controls the motor 20 for switching the shift range of the automatic transmission 3 by rotating and driving the detent plate 32. The ECU 60 includes the MOS transistors 61-63, the MPU 80, the MOS driving circuit 72, the current detecting circuit 74 and the current limit circuit 75.

The MOS transistors 61-63 are arranged to correspond to three phases of the windings 22. When the MOS transistor 61-63 turns on, the corresponding winding 22 is energized. When the MOS transistor 61-63 turns off, the energization of the corresponding winding 22 is stopped. The MPU 80 and the MOS driving circuit 72 control the MOS transistors 61-63 to turn on and off, so that they controls the driving operation of the motor 20. The current detecting circuit 74 is connected to the merging point P1, at which the current flowing through the windings 22 and the MOS transistors 61-63 is merged. Thus, the circuit 74 detects the current flowing at the merging point P1. The current limit circuit 75 controls the current flowing through the windings 22 and the MOS transistors 61-63 so that the average of the current detected by the current detecting circuit 74 is disposed within the predetermined range.

The MPU 80 includes the standard position learning element, the shift range determination element, and the error detecting element as an ideal function part. The standard position learning element restricts the current flowing through the windings 22 and the MOS transistors 61-3 using the current limit circuit 75, and rotates the motor 20 until the detent plate 32 stops at the limit position of the movable range. Thus, the learning element learns the standard position of the motor 20.

The shift range determination element determines the shift range of the automatic transmission 3. The error detecting element determines that at least one of the current detecting circuit 74 and the current limit circuit 75 malfunctions when the standard position learning device executes the standard position learning process under a condition that the shift range determination device determines that the shift range is in the non-learning range, and the detent plate 32 does not reach the limit position of the movable range.

In the above ECU 60, when the MPU 80 learns the standard position of the motor 20, the current limit circuit 75 restricts the current flowing through the windings 22 and the MOS transistors 61-63 based on the current detected by the current detecting circuit 74, and the motor 20 is rotated and driven. Thus, the change of the current in each phase and the change of the torque of the motor 20 caused by the temperature change and the chronological change are restricted. Accordingly, in the present embodiment, the learning accuracy of the standard position is improved notwithstanding the condition.

In the present embodiment, the MPU 80 can detect an error such that one of or both of the current detecting circuit 74 and the current limit circuit 75 malfunctions so that the torque for moving the detent plate 32 to the position corresponding to the learning range is not generated. Thus, the MPU 80 avoids the standard position learning operation under a condition that the current detecting circuit 74 and/or the current limit circuit 75 malfunction. Accordingly, the MPU 80 avoids the malfunction and/or loss of control of the motor 20 caused by an erroneously learned standard position.

In the present embodiment, the error determining element of the MPU 80 determines that at least one of the current detecting circuit 74 and the current limit circuit 75 malfunctions when the detent plate 32 does not reach the limit position of the movable range after the standard position learning device starts to learn the standard position before the predetermine time has elapsed. Thus, since the error in the current detecting circuit 74 and the current limit circuit 75 is detected by a simple process, the process time is reduced. Further, the process load of the MPU 80 is restricted. Further, the error determining element determines that the current detecting circuit 74 and the current limit circuit 75 function normally when the detent plate 32 reaches the limit position of the movable range within the predetermined time interval.

In the present embodiment, the error determining element of the MPU 80 determines based on the signal output from the output shaft sensor 8 for detecting the rotation position of the detent plate 32 whether the detent plate 32 reaches the limit position of the movable range. Accordingly, the MPU 80 can determine with high accuracy whether the detent plate 32 reaches the limit position of the movable range. Further, since the output shaft sensor 8 mounted on the vehicle is used for executing the error determination process, the system is manufactured with a comparatively low cost and a simple structure.

In the present embodiment, the torque generated by flowing the current of the lower limit of the predetermined range through the windings 22 is set to reach the shift range of the automatic transmission 3 from the non-learning range to the learning range. Accordingly, the accuracy of the error determination process executed by the error determining element of the MPU 80 is improved.

In the present embodiment, the shift-by-wire system 1 includes the ECU 60, the motor 20 controlled by the ECU 60, and the detent plate 32 for switching the shift range of the automatic transmission 3 by rotating and driving the motor 20. In the present embodiment, the ECU 60 provides the improvement of the accuracy of learning the standard position notwithstanding the condition such as the temperature change and the chronological change. The system 1 detects the error of the current detecting circuit 74 and the current limit circuit 75, so that the malfunction of the motor 20 and the loss of control of the motor 20 are avoidable. Thus, the ECU 60 controls the shift-by-wire system 1 effectively.

Other Embodiments

In the above embodiment, just after the shift-by-wire system 1 is activated, the actual range is determined based on the signal output from the output shaft sensor just after the shift-bi-wire system is activated. In other embodiments, for example, the actual range in a case where the power source of the vehicle turns off is stored in the memory, which maintains the contents in the memory even when the power source of the vehicle turns off. Based on the data in the memory, the actual range is determined after the shift-by-wire system is activated.

In the above embodiment, based on the signal output from the output shaft sensor, it is determined whether the detent plate reaches the limit position of the movable range. In the other embodiments, based on the output signal from the encoder, which detects the rotation of the motor, it may be determined whether the detent plate reaches the limit position of the movable range. Specifically, for example, the change amount of the counting value of the pulse signal is preliminary obtained when the actual range is changed from the N range to the P range. Based on the feature whether the counting value of the pulse signal changes by the preliminary obtained change amount, it is determined whether the detent plate reaches the limit position of the movable range. Even in this case, since the error determination process is executed using a conventional encoder for a motor control, the system has a simple construction and a manufacturing cost of the system is low.

In the previous embodiment, the limit position of the movable range is a position corresponding to the P range and the D range when the ECU executes the standard position learning control operation. On the other hand, in another embodiment, the limit position of the movable range may be a position corresponding to a range other than the P range or a position corresponding to only one range when the ECU executes the standard position learning control operation. For example, when multiple concavities of the outer peripheral of the detent plate correspond to the P range, the R range, the N range and the D range in an order along the rotation direction, the limit position of the movable range may be a position corresponding to the D range only or the P range only.

In the previous embodiment, when the system 1 executes the standard position learning control operation, the motor is rotated with the two-phase energizing method such that two phases among three phases of the windings 22 are energized, and the energizing phases are switched in turn. On the other hand, in another embodiment, when the system 1 executes the standard position learning control operation, the motor may be rotated with the one-two-phase energizing method such that a one-phase energizing step for energizing one phase of the winding in three phases and a two-phase energizing step for energizing two phases among three phases of the windings are alternately switched.

In another embodiment, the control object may be a motor having four or more windings corresponding to four or more phases. Alternatively, the motor as the control object may be another brushless synchronous motor other than the switched reluctance motor as long as the rotation position of the motor is detected according to the output signal (i.e., the pulse signal) of the encoder, and the energizing phase is switched.

In the previous embodiment, the encoder for detecting the relative rotation position of the motor is a magnetic type encoder. Alternatively, in another embodiment, for example, the encoder may be an optical type or brush type encoder. The encoder outputs the pulse signal in the A phase or the B phase in the previous embodiment. Alternatively, the encoder may output a Z phase signal as an amendment or an index in addition to the pulse signal in the A phase or the B phase.

In another embodiment, the control apparatus may not include the relay for allowing or interrupting the electric power supply to the motor from the power source.

In another embodiment, the number of concavities of the detent plate may be different from four. Specifically, the number of ranges of the automatic transmission may be three or less or five or more.

The shift-by-wire system according to the present disclosure may be applied to a continuously variable transmission (i.e., CVT) for switching the P range, the R range, the N range and the D range, an automatic transmission for a hybrid vehicle, a switching range device having a parking mechanism for switching the P range and the not-P range in an electric vehicle or a hybrid vehicle.

In the previous embodiment, the detent mechanism is provided by multiple concavities formed on the detent plate integrated with the manual shaft and the detent roller. In another embodiment, the detent mechanism including multiple concavities and the detent roller may be arranged near the reducer in the actuator. Alternatively, if the rotation position of the driving object is maintained at a predetermined position, the detent mechanism may be another construction other than the detent mechanism including multiple concavities and the detent roller.

The control apparatus according to the present disclosure may be applied to various switching devices for the synchronous brushless motor as a driving power source in addition to the shift range switching device.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control apparatus that controls a motor, which has a plurality of windings respectively corresponding to a plurality of phases, and rotates and drives an object to switch a shift range of a transmission, the control apparatus comprising:
    a plurality of switching devices, each of which corresponds to one of the plurality of phases, allows energization to a corresponding winding when the switching device turns on, and interrupts the energization to the corresponding winding when the switching device turns off;
    a controller that controls the switching devices to turn on and off so that the controller controls an operation of the motor;
    a current detecting circuit that detects a current flowing through each winding and each switching device;
    a current limit circuit that limits the current flowing through each winding and each switching device to keep an average of the current within a predetermined range;
    a standard position learning device that learns a standard position of the motor in such a manner that the current limit circuit limits the current flowing through each winding and each switching device, and the controller controls the motor to rotate until the object stops at a limit position of a movable range;
    a shift range determination device that determines the shift range of the transmission; and
    an error determination device that determines whether at least one of the current detecting circuit and the current limit circuit malfunctions,
    wherein the standard position learning device learns the standard position of the motor at a shift range, which is defined as a learning range,
    wherein a shift range other than the learning range is defined as a non-learning range, and
    wherein the error determination device determines that at least one of the current detecting circuit and the current limit circuit malfunctions under a condition that the object does not reach the limit position of the movable range when the shift range determination device determines that the shift range of the transmission is in the non-learning range, and the standard position learning device starts to learn the standard position.

2. The control apparatus according to claim 1,
    wherein the error determination device determines that at least one of the current detecting circuit and the current limit circuit malfunctions under a condition that the object does not reach the limit position of the movable range after the standard position learning device starts to learn the standard position before a predetermined time has elapsed.

3. The control apparatus according to claim 1,
    wherein the error determination device determines based on a signal output from a rotation detector for detecting a rotation position of the object or a rotation angle of the motor whether the object reaches the limit position of the movable range.

4. The control apparatus according to claim 1,
    wherein a torque generated by the current at a lower limit of the predetermined range flowing through the windings is set to reach the shift range of the transmission from the non-learning range to a shift range corresponding to the limit position.

5. A shift-by-wire system comprising:
    a control apparatus;
    a motor controlled by the control apparatus; and
    an object rotated and driven by the motor,
    wherein the motor has a plurality of windings respectively corresponding to a plurality of phases, and rotates and drives an object to switch a shift range of a transmission,
    wherein the control apparatus includes:
        a plurality of switching devices, each of which corresponds to one of the plurality of phases, allows energization to a corresponding winding when the switching device turns on, and interrupts the energization to the corresponding winding when the switching device turns off;
        a controller that controls the switching devices to turn on and off so that the controller controls an operation of the motor;
        a current detecting circuit that detects a current flowing through each winding and each switching device;
        a current limit circuit that limits the current flowing through each winding and each switching device to keep an average of the current within a predetermined range;
        a standard position learning device that learns a standard position of the motor in such a manner that the current limit circuit limits the current flowing through each winding and each switching device, and the controller controls the motor to rotate until the object stops at a limit position of a movable range;
        a shift range determination device that determines the shift range of the transmission; and
        an error determination device that determines whether at least one of the current detecting circuit and the current limit circuit malfunctions,
    wherein the standard position learning device learns the standard position of the motor at a shift range, which is defined as a learning range,
    wherein a shift range other than the learning range is defined as a non-learning range, and
    wherein the error determination device determines that at least one of the current detecting circuit and the current limit circuit malfunctions under a condition that the object does not reach the limit position of the movable range when the shift range determination device determines that the shift range of the transmission is in the non-learning range, and the standard position learning device starts to learn the standard position.

6. The shift-by-wire system according to claim 5, wherein the error determination device determines that at least one of the current detecting circuit and the current limit circuit malfunctions under a condition that the object does not reach the limit position of the movable range after the standard position learning device starts to learn the standard position before a predetermined time has elapsed.

7. The shift-by-wire system according to claim 5, wherein the error determination device determines based on a signal output from a rotation detector for detecting a rotation position of the object or a rotation angle of the motor whether the object reaches the limit position of the movable range.

8. The shift-by-wire system according to claim 5, wherein a torque generated by the current at a lower limit of the predetermined range flowing through the windings is set to reach the shift range of the transmission from the non-learning range to a shift range corresponding to the limit position.

\* \* \* \* \*